United States Patent
Hubbard et al.

(10) Patent No.: US 6,368,677 B2
(45) Date of Patent: Apr. 9, 2002

(54) METHOD OF PRIMING POLYOLEFIN ARTICLES FOR COATING

(75) Inventors: Michael A. Hubbard, Somerset; James A. McCaulley, Clinton; Douglas R. Holcomb, South Orange, all of NJ (US)

(73) Assignee: Hoechst Trespaphan GmbH, Neunkirchen (DE)

( * ) Notice: Subject to any disclaimer, the term of this patent is extended or adjusted under 35 U.S.C. 154(b) by 0 days.

(21) Appl. No.: 09/855,267

(22) Filed: May 15, 2001

Related U.S. Application Data

(60) Division of application No. 08/870,407, filed on Jun. 6, 1997, now Pat. No. 6,254,994, which is a continuation-in-part of application No. 08/662,836, filed on Jun. 12, 1996, now abandoned.

(51) Int. Cl.[7] .............................. B05D 1/38; B05D 3/02; B05D 3/06; B05D 3/10
(52) U.S. Cl. ..................... 427/534; 427/536; 427/307; 427/309; 427/340; 427/412.3; 427/419.7
(58) Field of Search ............................ 427/412.3, 419.7, 427/534, 536, 307, 309, 340

(56) References Cited

U.S. PATENT DOCUMENTS

| | | |
|---|---|---|
| 1,949,914 A | 3/1934 | Larson |
| 2,998,328 A | 8/1961 | Munger |
| 3,102,038 A | 8/1963 | Fisher |
| 3,130,061 A | 4/1964 | McMahon |
| 3,180,747 A | 4/1965 | Patton |
| 3,282,729 A | 11/1966 | Richardson |
| 3,470,013 A | 9/1969 | Wagner |
| 3,476,582 A | 11/1969 | Imoto |
| 3,481,764 A | 12/1969 | Matsumoto |
| 3,492,137 A | 1/1970 | Iler |
| 3,522,066 A | 7/1970 | Forsyth |
| 3,533,816 A | 10/1970 | Oken |
| 3,652,273 A | 3/1972 | Htoo |
| 3,706,603 A | 12/1972 | Vessey |
| 3,884,863 A | 5/1975 | Beers |
| 3,916,063 A | 10/1975 | Dratz |
| 4,036,721 A | 7/1977 | Kato |
| 4,101,050 A | 7/1978 | Buckler |
| 4,178,273 A | 12/1979 | Brown |
| 4,247,576 A | 1/1981 | Kutner |
| 4,254,170 A | 3/1981 | Roullet |
| 4,363,840 A | 12/1982 | Roullet |
| 4,466,831 A | 8/1984 | Murphey |
| 4,466,832 A | 8/1984 | Yoshimura |
| 4,503,158 A | 3/1985 | Richard |
| 4,514,456 A | 4/1985 | Deal |
| 4,537,866 A | 8/1985 | Gilson |
| 4,680,208 A | 7/1987 | Aoki |
| 4,681,818 A | 7/1987 | Unnam |
| 4,738,896 A | 4/1988 | Stevens |
| 4,775,586 A | 10/1988 | Bohrn |
| 4,803,231 A | 2/1989 | Seinera |
| 4,880,487 A | 11/1989 | Sheehan |

(List continued on next page.)

FOREIGN PATENT DOCUMENTS

| | | |
|---|---|---|
| AU | 16839/70 | 1/1972 |
| CA | 993738 | 7/1976 |
| EP | 084266 A2 | 7/1983 |
| EP | 108827 | 5/1984 |
| EP | 311432 A3 | 4/1989 |
| EP | 518646 A1 | 12/1992 |
| EP | 518647 A1 | 12/1992 |
| GB | 1007482 | 10/1965 |
| GB | 1424425 | 2/1976 |
| GB | 1532847 | 11/1978 |
| JP | S52-135339 | 11/1977 |
| JP | S60-5057 | 1/1985 |
| JP | 05-295299 | * 11/1993 |
| JP | H6-240174 | 8/1994 |
| JP | H7-18202 | 1/1995 |
| JP | 08-092400 | * 4/1996 |
| JP | 2000-178471 | * 6/2000 |
| WO | WO96/16798 A1 | 6/1996 |
| WO | WO97/44379 A1 | 11/1997 |
| WO | WO97/47678 A1 | 12/1997 |
| WO | WO97/47694 A1 | 12/1997 |
| WO | WO97/47695 A1 | 12/1997 |

OTHER PUBLICATIONS

N. Tomomi et al, "Surface Treatment for Thermoplastic Resin Sheet", Japanese Publication No. 08092400, published Apr. 9, 1996 (Abstract only).

E I Dupont De Nemours & CO INC., "Fireproof Silicate Paints", Product Licensing Index, vol. 78, No. 8458, Havant GB, pp. 177 (Apr., 1971).

H. Van Olphen, "Clay Mineralogy", in an Introduction to Clay Colloid Chemistry for Clay Technologists, Geologists, and Soil Scientists, Interscience Publishers a division of John Wiley & Sons, vol. 27, pp. 69–71 (1963).

H. Weldes et al, "Properties of Soluble Silicates", Industrial and Engineering Chemistry, 61(4):29–43 (Apr., 1969).

W. Ward et al, "Gas Barrier Improvement Using Vermiculite and Mica in Polymer Films", Journal of Membrane Science, 55:173–180 (1991).

*Primary Examiner*—Erma Cameron
(74) *Attorney, Agent, or Firm*—Howson and Howson

(57) ABSTRACT

A method for providing a waterborne, inorganic barrier coating to a polyolefin substrate is described. The method involves applying a primer composition containing a vinyl polymer, wherein at least 75% of the polymer repeat units contain side groups having hydroxyl moieties, to the substrate. This primer coating facilitates the application and binding of the subsequently applied barrier coating composition to the substrate.

15 Claims, No Drawings

U.S. PATENT DOCUMENTS

| | | |
|---|---|---|
| 4,889,765 A | 12/1989 | Wallace |
| 4,911,960 A | 3/1990 | Mudge |
| 4,937,115 A | 6/1990 | Leatherman |
| 4,945,074 A | 7/1990 | Blount |
| 5,034,252 A | 7/1991 | Nilsson |
| 5,049,609 A | 9/1991 | Patitsas |
| 5,055,137 A | 10/1991 | Holcombe |
| 5,073,419 A | 12/1991 | Kansupada |
| 5,130,110 A | 7/1992 | Rouet |
| 5,164,003 A | 11/1992 | Bosco |
| 5,183,704 A | 2/1993 | Bohrn |
| 5,192,620 A | 3/1993 | Chu |
| 5,238,668 A | 8/1993 | Novotny |
| 5,244,729 A | 9/1993 | Harrison |
| 5,290,845 A | 3/1994 | Berg |
| 5,330,794 A | 7/1994 | Bosco |
| 5,344,633 A | 9/1994 | Sörensson |
| 5,354,548 A | 10/1994 | Araya |
| 5,384,192 A | 1/1995 | Long |
| 5,393,560 A | 2/1995 | Okada |
| 5,451,455 A | 9/1995 | Peiffer |
| 5,462,779 A | 10/1995 | Misiano |
| 5,487,940 A | 1/1996 | Bianchini |
| 5,491,023 A | 2/1996 | Tsai |
| 5,496,649 A | 3/1996 | Mallory |
| 5,503,820 A | 4/1996 | Moffett |
| 5,508,113 A | 4/1996 | Knoerzer |
| 5,512,338 A | 4/1996 | Bianchini |
| 5,552,469 A | 9/1996 | Beall |
| 5,560,773 A | 10/1996 | Gimvang |
| 5,565,273 A | 10/1996 | Egli |
| 5,575,953 A | 11/1996 | Tachizono |
| 5,667,886 A | 9/1997 | Gough |
| 5,853,830 A | 12/1998 | McCaulley |
| 5,882,798 A | 3/1999 | Hubbard |
| 5,902,643 A | 5/1999 | Carlblom |
| 5,925,428 A | 7/1999 | Hubbard |
| 6,004,680 A | 12/1999 | Abed |
| 6,013,128 A | 1/2000 | Hubbard |
| 6,051,296 A | 4/2000 | McCaulley |
| 6,071,624 A | 6/2000 | Hubbard |
| 6,086,991 A | 7/2000 | Hubbard |
| 6,254,994 B1 | 7/2001 | Hubbard |

\* cited by examiner

METHOD OF PRIMING POLYOLEFIN ARTICLES FOR COATING

CROSS-REFERENCE TO OTHER APPLICATIONS

This is a divisional of U.S. patent application Ser. No 08/870,407, filed Jun. 6, 1997, now U.S. Pat. No. 6,254,994 which is a continuation-in-part of U.S. patent application Ser. No. 08/662,836, filed Jun. 12, 1996, now abandoned.

BACKGROUND OF THE INVENTION

The coating of thermoplastic polymer substrates with moisture resistant barrier coating compositions to provide impermeability to gases such as oxygen, and liquids, is known. See, e.g., U.S. Pat. No. 3,282,729, which describes applying a water solution of poly(vinyl alcohol) (PVOH) and trimethylolphenol to a thermoplastic polymer substrate at an elevated temperature. Also, for example, U.S. Pat. No. 5,073,419 refers to a film composite comprising a linear low density polyethylene film having a PVOH coat of a thickness of about 0.1 to about 3 mils. U.S. Pat. No. 5,487,940 refers to a metallized polymeric film structure including an oxygen barrier and a moisture barrier. The oxygen barrier includes cross-linked PVOH and the moisture barrier is preferably metallized oriented polypropylene or polyethylene.

Similarly, U.S. Pat. No. 4,254,170 refers to biorented polyester hollow bodies wherein one wall of a preform is coated with an aqueous composition consisting of at least two incompatible polymers, one of which is a water soluble PVOH and the other, a polymer latex with low water sensitivity.

U.S. Pat. No. 5,384,192 refers to a structure comprising an inorganic oxide substrate having an organic polymer layer. There is an adhesion promoting layer between the substrate and organic polymer layer. One component of the adhesion layer is poly(vinyl phenol), also known as poly(hydroxystyrene).

U.S. Pat. No. 5,192,620 refers to a metallized film composition comprising a polymer substrate having a surface which is modified by an adhesion promoting agent, in which the modified surface is provided with a skin layer of PVOH. The PVOH skin layer is applied by a solution coating process. The skin layer has a metal layer directly thereon.

U.S. Pat. No. 5,491,023 refers to a metallized film composition comprising a polymer substrate having a surface which is modified by an adhesion promoting agent; the modified surface is provided with a skin layer of PVOH. The PVOH skin layer is applied by an extrusion process. The skin layer has a metal layer directly thereon.

Despite the wealth of art in barrier coatings, currently available polymeric films do not accommodate the need in the market for longer shelf life of packaged food. Further, many of these products (e.g., films coated with aluminum) are not microwave-safe, or are not readily disposable (e.g., films coated with poly(vinylidene chloride), and thus fail to satisfy environmental concerns.

There exists a need in the art for additional compositions and methods which provide improved barrier coatings to polymeric products, e.g., films, bottles, etc.

SUMMARY OF THE INVENTION

In one aspect, the present invention provides a method for providing a barrier coating to a polyolefin substrate, preferably a film. The method involves the steps of applying to the polymeric substrate a primer composition containing a random vinyl copolymer comprised of repeat units, wherein at least 75% of said copolymer repeat units contain side groups having hydroxyl moieties. The primer layer is then dried. The third step of the method involves subsequently applying a waterborne barrier coating solution which forms a dry inorganic barrier layer over the dried primer layer.

In another aspect, the present invention provides a barrier-coated polyolefin article.

Other aspects and advantages of the present invention are described further in the following detailed description of the preferred embodiments thereof.

DETAILED DESCRIPTION OF THE INVENTION

The present invention provides a method of promoting the wetting of waterborne barrier coating solutions on polyolefin substrates and adhesion of resulting inorganic barrier layers to polyolefin substrates by applying a selected primer composition to the substrate before application of the barrier coating solution. The improved adhesion of dried inorganic barrier layers is manifested in improved vapor barrier performance.

I. The Primer Compositions

A primer composition according to the present invention contains a random vinyl polymer comprised of repeat units, (i.e., derived from "vinyl" monomers like ethylene, propylene, vinyl acetate, vinyl phenol, etc.) wherein at least 75% of said polymer repeat units contain side groups having hydroxyl moieties. Desirably, vinyl polymers include poly(vinyl alcohol) and poly(para-hydroxystyrene).

In one embodiment, the vinyl polymer useful in the primer is a poly(vinyl alcohol) (PVOH). There are numerous PVOH variants available commercially and/or known in the art. For example, such PVOH variants vary in characteristics such as molecular weight and percentage hydrolyzed. Poly(vinyl alcohol) is derived from poly(vinyl acetate) by hydrolysis of the acetate function. Typically a fraction of the acetate functions are left intact to impart different properties. The percent hydrolysis refers to the fraction of acetate groups which have been hydrolyzed to hydroxyl moieties. Desirably, the average molecular weight distribution of the PVOH polymers useful in the primer composition is between about 50,000 and about 185,000 and the PVOH is more than about 75% hydrolyzed.

The PVOH useful in this invention may be modified by randomly replacing some of the vinyl alcohol groups with vinyl butyral groups as depicted by the formula:

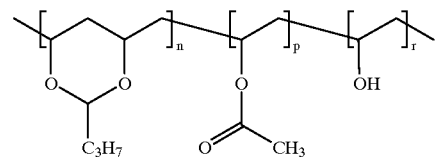

wherein n, p, and r denote the mole fractions of the polymer repeat units and the sum of n, p and r is 1. To achieve satisfactory wetting of barrier coating solutions on these primer layers it is preferable that r is at least 0.75. Desirably, the average molecular weight of such a modified PVOH is between about 40,000 and 100,000.

The PVOH variants may be dissolved in a suitable solvent (e.g. water, isopropanol, or mixtures thereof), so that the primer composition is characterized by a solids level of between 0.1% and 10% by weight. When the polymer in the primer composition is PVOH, preferably, the solvent useful in the primer composition is water. However, other suitable solvents for PVOH may be readily selected by one of skill in the art.

It is well known that PVOH solutions support the growth of microorganisms. To prevent this, it is conventional practice to optionally add at least one biocidal agent to the coating solution. Desirable biocides include those with the active ingredients 5-chloro-2-methyl-4-isothiazolin-3-one, 2-methyl-4-isothiazolin-3-one, or 1-(3-chloroallyl)-3,5,7-triaza-1-azoniaadamantane chloride. A representative biocide that was found not to interfere with the performance of dried primer layers in coated articles of the present invention is Kathon® LX (Rohm and Haas) biocide.

Another embodiment of a vinyl polymer useful in the primer composition is a linear or branched poly(para-hydroxystyrene) (PHS) or a variant thereof. There are a number of PHS variants available commercially and/or known to the art. For example, such PHS variants vary in characteristics such as molecular weight, impurities and degree of branching. While the examples below employ several variants of poly(para-hydroxystyrene), (branched, linear, and partially converted to phenoxide salts) it is anticipated that other PHS variants, for example copolymers in which the PHS mole fraction is at least 0.75, will work similarly in the primer composition and method of this invention.

Desirably, the primer composition containing PHS is characterized by a solids level of between 0.1% and 10% by weight. Preferably where the polymer in the primer composition is a PHS variant, the solvent is a dilute aqueous solution of alkaline metal hydroxide. For example, a lithium (or sodium or potassium) hydroxide concentration of 0.1 N may be used to prepare a 1 weight percent solution of PHS. In this solvent PHS is partially converted to an alkali metal (e.g., lithium) phenoxide salt. The resulting linear or branched random copolymer has the formula:

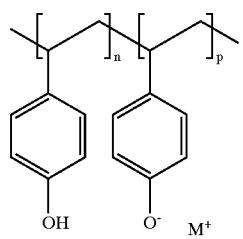

where $M^+$ is a monovalent cation (e.g., $Li^+$) and the sum of the mole fractions, n and p, is 1. The mole fraction, p, of the phenoxide salt can be controlled by adjusting the concentration of alkaline metal hydroxide.

Dynamic contact angle experiments have demonstrated that use of PHS solutions in 0.1 N LiOH to form a primer layer on corona-treated, biaxially-oriented polypropylene (BOPP) films provides a surface that is completely wetted by water. Further, metal copolysilicate coatings have been found to wet such a primed surface extremely well, and barrier layers produced thereby give good vapor barrier performance. For solutions with lesser amounts of base, a cosolvent is required to achieve complete PHS dissolution. Such a cosolvent may be readily selected by one of skill in the art. One exemplary suitable cosolvent is isopropanol. Alternatively, PHS may be simply dissolved in an alcohol, such as ethanol, propanol, butanol, isopropanol (2-propanol) and similar alcohols, alone or in mixtures. Neutral PHS solutions prepared using high purity PHS (e.g. Hoechst Celanese Electronic Grade), yield neutral PHS primer layers that exhibit time-dependent and pH-dependent wettability. Solutions with pH above 12 completely wet neutral PHS primer layers. PHS primer solutions prepared using lower purity PHS (e.g. Hoechst Celanese Polymer Grade) yield primer layers that are equally wettable at any pH above 7.

Optionally, the primer solution, whatever the identity of the primer polymer, further contains one or more surfactants to reduce surface tension. It was found that surfactants were unnecessary when applying primers by spin-coating; however wetting requirements were more severe when applying primers by roll coating methods, e.g. reverse gravure coating. Suitable surfactants may be readily selected by one of skill in the art. The surfactant selected should possess a critical micelle concentration sufficiently low to ensure a dried primer coating uncompromised by residual surfactant. Preferably, the surfactant is selected from the group consisting of acetylenic diols (e.g., such as those provided commercially by Air Products) and alkyl ethoxylates (such as those provided commercially by, among others, Hoechst Celanese). Of the former group a preferred surfactant is the Dynol® 604 surfactant; of the latter group a preferred surfactant is the Genapol® UD050 surfactant. The amount of surfactant added to the primer composition will depend on the particular surfactant selected, but should be the minimum amount of surfactant that enables adequate wetting of the primer solution on the polyolefin substrate. For example, typical surfactant amounts can be about 0.1% by weight of an acetylenic diol or an alkyl ethoxylate. Because Dynol® 604 surfactant is sparingly soluble in water, it has been observed that primer solutions containing 0.1% Dynol® 604 surfactant have droplets of undispersed surfactant floating on the surface of the primer solution. It was observed that this causes formation of scum around the meniscus of the coating solution in containers such as jars, drums, and solution holding tanks. In preferred primer solutions, this is alleviated by adding a second surfactant, preferably Genapol® UD050 surfactant, to improve the dispersion of the Dynol® 604 surfactant.

II. Waterborne, Inorganic Barrier Coating Compositions Useful in the Invention.

The method of the invention is useful with a variety of waterborne, inorganic coating compositions, such as those described below, that act as barriers to gases, vapors and aromas.

By "waterborne" is meant coatings that are applied from solutions in which the solvent is primarily water, but which may contain smaller amounts of cosolvents such as, but not limited to, isopropanol.

The term "vapor" implies a liquid at partial pressure, such as water vapor. The term "gas" includes oxygen, nitrogen, carbon dioxide and others. "Aroma" includes those materials which bear a fragrance, for example, menthol and others. For simplicity, as used herein, the term "vapor barrier" can be interpreted to mean a barrier to gases and aromas as well as traditionally defined vapors.

Similarly as used herein, the term "solution" is interpreted to include colloidal dispersions and suspensions. By "colloidal dispersion or suspension" is meant any dispersion or suspension of particles in liquid, the particles being of a size greater than molecular scale that do not settle out. Generally, the particle size in a suspension or dispersion of this invention are from about 10 to about 50,000 Angstroms. "Coating solution" as used herein is meant a liquid containing dissolved or suspended solids that do not settle out and which is used to apply said solids to a substrate.

In one embodiment the inorganic, waterborne coating contains an alkali metal polysilicate, such as sodium polysilicate, potassium polysilicate, or lithium polysilicate or mixtures thereof.

In another embodiment the coating solution contains a copolysilicate, i.e., a mixture of two different alkali metal polysilicates. In a preferred embodiment the barrier coating solution contains a copolysilicate of lithium and potassium represented by the formula, $(Li_2O)_x(K_2O)_{1-x}(SiO_2)_y$, wherein y is greater than 4.6 if x is less than 1 or x is greater than 0.5 if y is between 1 and 10.

Another desirable barrier coating contains a selected layered silicate (e.g. the delaminated vermiculite Micro-Lite® product, of W. R. Grace) dispersed in a solid matrix of an alkali metal polysilicate (or mixtures thereof), such that the weight percentage of the layered silicate in the dried barrier coating layer ranges from 1% to 99%.

Specific formulations of suitable barrier coatings for use in the method and compositions of this invention are described in more detail in the examples below.

III. Practice of the Method

Advantageously, in the practice of the method of the invention, the primer composition promotes good wetting of the subsequently applied coating solution to the substrate and good adhesion of the dried inorganic barrier layer. The latter advantage is manifested in improved vapor barrier performance of coated articles prepared according to the present method.

A. The Substrate

The method of this invention is particularly well suited for use on polymeric substrates such as polyolefins, particularly polyethylene, polypropylene, copolymers thereof, and cycloolefinic copolymers (COC) such as a copolymer of ethylene and norbornene [U.S. Pat. No. 5,087,677]. Typically, polypropylene films are biaxially-oriented, depending on the customer requirements. The articles coated by this method include, without limitations, polymeric films and sheets, rigid and semi-rigid containers, and other surfaces. Especially preferred articles for coating according to the method of this invention are films, bottles, plastic containers, jars, blisterpacks and lidstocks, made of the foregoing polymers. In a particularly preferred embodiment, the articles are films or bottles used for food storage.

The polymeric articles to be coated by the primer and coating composition according to this invention may be previously untreated. Usually, the polymeric article, such as a film or bottle, is first plasma treated to improve wetting by the primer solutions and adhesion of the dried primer layer. Alternatively, the polymeric article may be corona-treated by the industry-wide corona discharge treatment method. Other applicable surface treatments that may precede application of the primer layer are flame treatment and chemical oxidation or etching. Optionally, after applying the primer solution and drying, the dried primer layer may be plasma treated, corona treated, flame treated, or chemically oxidized or etched before applying a barrier coating solution. Alternatively, the article may bear on at least one surface or side, a heat seal layer. Examples of such heat seal layers are an ethylene-propylene copolymer or ethylene-propylene-butylene terpolymer.

Exemplary polyolefin substrates used in the examples below are the FND xx and SCM xx grade biaxially-oriented polypropylene (BOPP) films produced by Trespaphan GmbH. The number, xx, refers to the film thickness in micrometers; thus FND 30 is a 30 µm (or 1.2 mil) thick BOPP film. These films are designed to be metallized by thermal or electron-beam evaporation of aluminum. FND and SCM grade BOPP films are three-layer laminates with thin heat-sealable layers on both sides. One side of the film is corona treated at the factory to a surface energy of 36–39 dynes/cm to improve adhesion of aluminum. Supplemental corona treatment, immediately before applying a primer solution, was found to be beneficial even for these films that were corona treated at the factory. Similar commercially available polypropylene films that will be suitable in the present invention include AQS, MT BASE, and MVT BASE films (AET Packaging Films). These all have a heat seal layer on one side only and, in the case of AQS, a high energy treated surface for waterborne coatings. These are all intended to be coated on the side opposite from the heat seal layer.

B. Application of the Primer

In a preferred embodiment, the primer solution is applied to provide a dried layer thickness of between about 10 to about 50 nm primer composition on the substrate. Thicker layers offer satisfactory, but not superior, performance, and are therefore less preferable on the basis of cost. The primer may be applied by any technique known to those of skill in the art. These techniques include, without limitation, roll coating, spray coating, and dip coating techniques. Conventional roll coating techniques include, but are not limited to, rod, roll, reverse roll, forward roll, air knife, knife over roll, blade, gravure and slot die coating methods. General descriptions of these types of coating methods may be found in texts, such as *Modern Coating and Drying Techniques*, (E. Cohen and E. Gutoff, eds; VCH Publishers) New York (1992) and *Web Processing and Converting Technology and Equipment*, (D. Satas, ed; Van Nostrand Reinhold) New York (1984). Three-dimensional articles may be coated by spray coating or dip coating. The method of application is not a limitation on the present invention, but may be selected from among these and other well-known methods by a person of skill in the art.

Preferred primer layers applied according to the present method are substantially continuous, i.e. very little of the polyolefin is exposed to the barrier coating solution. Dewetting of the primer solution from the substrate before or during drying causes voids in the primer layer and, subsequently, voids in the barrier layer. This yields a finished article having inferior (but possibly, for some applications, satisfactory) vapor barrier performance. In extreme cases, dewetting of primer solutions was observed to yield a polyolefin substrate that was largely uncovered, but merely decorated with particles of primer material. Atomic force microscopy may be used to confirm that dried primer layers are substantially continuous. Dewetting may be minimized by increasing treatment of the polyolefin substrate before applying the primer solution, increasing surfactant concentration, or increasing the viscosity of the primer solution. The latter is readily accomplished in PVOH primers by using high molecular weight PVOH grades and increasing the percent PVOH solids in the primer solution.

The primer layer is allowed to dry before application of the waterborne, inorganic coating layer. A conventional coating thickness of the selected waterborne inorganic oxide coating solution is applied over the primer layer, i.e., typical coating thicknesses as used in the absence of primer, such as between about 100 and about 500 nm on the surface of the substrate. The application of the coating solution may be performed as described above for application of the primer composition.

After coating the article with a barrier coating solution, the resulting product must be dried at a selected temperature at or above room temperature. The selection of the drying temperature depends on the desired time for drying; that is, accelerated drying times may be achieved at elevated temperatures which would not be necessary if a longer time period for drying was acceptable. However, one of skill in the art can readily adjust the oven temperature and exposure as desired. The performance of the dried barrier coating is insensitive to the drying temperature over the range 25–200° C. An advantage of the present method is that both the primer and barrier coatings can be dried at low temperature (<100° C.) which is necessary when roll-coating polypropylene film.

As one example, a resulting article (e.g., a BOPP film, 1 mil in thickness) coated according to the method of this invention is typically provided with an oxygen transmission rate (OTR) less than 50 cm$^3$/[m$^2$ day atm] at 23° C. and 50% relative humidity. In favorable instances an OTR of about 20 cm$^3$/[m$^2$ day atm] at 23° C. and 50% relative humidity can be achieved. This performance has been more reproducibly achieved in pilot scale reverse gravure coating experiments than in spin-coating experiments.

Significantly improved performance can be achieved if the dried barrier coating is covered with a protective top-coat layer. The top-coat may be either a thin (typically, but not necessarily, 1–10 μm thick) coating or a laminated film. Thin top-coatings may be applied by a variety of coating methods: roll coating, spray coating, dip coating. Laminates may be prepared by melt-extrusion lamination over the barrier coating or by adhesive lamination of a second film. Coated articles (BOPP films) prepared according to the present method, when provided with protective top-coat layers, have achieved OTRs of about 10 cm$^3$/[m$^2$ day atm] at 23° C. and 50% relative humidity. The top-coat further provides improved flex resistance, i.e. retention of vapor barrier performance after flexing, and moisture resistance, i.e. retention of vapor barrier performance at high relative humidity.

The following examples illustrate the preferred compositions and methods of the invention. These examples are illustrative only and do not limit the scope of the invention.

EXAMPLE 1

PREPARATION OF AN AQUEOUS POLY(PARA-HYDROXYSTYRENE) PRIMER SOLUTION

An exemplary aqueous base solution of poly(para-hydroxystyrene) primer (denoted PHS-Li) was prepared as follows. A 0.1 N solution of lithium hydroxide was prepared by dissolving 4.19 g lithium hydroxide monohydrate in sufficient distilled water to make 100.0 ml of solution. A one weight percent solution of PHS-Li was prepared by adding 1.00 g finely ground PHS (Hoechst Celanese, Polymer Grade) to 99.0 g of 0.1 N lithium hydroxide solution and heating at 50° C. until the solids were dissolved. The resulting brown-orange solution was filtered through fluted filter paper before use. A change in color of the solution from orange-brown to green-brown occurred on standing overnight, but did not affect the performance of the solution as a primer for metal polysilicate barrier coatings.

EXAMPLE 2

PREPARATION OF A SOLVENT-BASED POLY(PARA-HYDROXYSTYRENE) PRIMER SOLUTION

An exemplary alcoholic primer solution (denoted PHS-OH) of poly(para-hydroxystyrene) was prepared as follows.

A one weight percent solution of PHS-OH was prepared by adding 1.00 g of finely ground PHS (Hoechst Celanese, Polymer Grade) to sufficient 2-propanol to make 100.0 ml of solution. The mixture was heated at 50° C. until the solids dissolved. The resulting pale orange solution was filtered through fluted filter paper before use. A color change similar to that described in Example 1 occurred in this solution as well, but to a lesser extent and didn't affect the performance of the solution as a primer for metal polysilicate barrier coatings.

EXAMPLE 3

EFFECT OF LITHIUM HYDROXIDE ON COMPOSITION OF DRIED PHS PRIMER LAYER

A dried primer layer prepared using PHS dissolved in aqueous lithium hydroxide differs from one prepared using PHS dissolved in isopropanol. The inventors found that the primer layer being deposited from the PHS/aqueous base primer was not neutral PHS, but PHS in which a fraction of the weakly acidic phenolic moieties had been converted to phenoxide in the presence of lithium hydroxide. X-ray photoelectron spectroscopy (XPS) measurements were performed on BOPP films (Trespaphan® FND 30 grade) primed with either the lithium hydroxide solution of PHS described in Example 1 above (denoted PHS-Li, signifying partial conversion to a polymeric Li phenoxide salt) or a one weight percent solution of PHS in isopropanol described in Example 2 (denoted PHS-OH, signifying a neutral phenolic polymer). The surface elemental compositions were determined at three separate points on each sample and averaged. Agreement across the three points was exceptional (standard deviation <0.7%), demonstrating a high degree of lateral composition uniformity in dried primer layers.

As can be seen in Table I, the carbon/oxygen ratio observed by XPS agrees well with that calculated for a PHS polymer chain having the formula, $(C_8H_8O)_n$. Hydrogen atoms are not detectable by XPS. In the case of the PHS-Li coating, the XPS-obtained carbon/oxygen ratio is 2.9. As shown in Table I, this is lower than the ratio of 3.6 expected for a coating consisting entirely of PHS and LiOH prepared as described. Because of the hydrophilic nature of both PHS and LiOH, it is reasonable to assume that some water is retained in the coating. If one assumes that one equivalent of water per lithium ion is retained by the coating, then the carbon/oxygen ratio agrees better with experiment.

In the PHS-OH spectra, one peak due to oxygen is observed at 533.8 eV and can be attributed to covalently bonded oxygen (e.g., phenol). In the PHS-Li, sample, a second peak is observed at 532.6 eV, consistent with an ionic oxide species (e.g. lithium phenoxide or hydroxide). The relative abundance of these two species is 55.5 to 44.5, with the greater portion being of ionic character.

TABLE I

Surface Composition of PHS-primed BOPP films by XPS

| Sample[1] | Carbon atom percent | Oxygen atom percent | Lithium atom percent | Carbon/Oxygen Ratio | Carbon/Lithium Ratio |
|---|---|---|---|---|---|
| PHS—OH obs'd | 87.9 | 12.0 | — | 7.3 | — |
| PHS—OH calc'd[2] | 88.9 | 11.1 | — | 8 | — |
| PHS—Li obs'd | 68.1 | 23.2 | 7.7 | 2.9 | 8.8 |
| PHS—Li calc'd[3] | 70.2 | 19.3 | 10.5 | 3.6 | 6.7 |
| PHS—Li calc'd[4] | 66.7 | 23.2 | 10.0 | 2.9 | 6.7 |

[1]P (0.1 atoms %) was observed in the PHS—OH sample and P (0.05 atom %) N (0.6 atoms %) and S, Cl, Na (each 0.1 atom % were detected in the PHS—Li sample. Hydrogen is not detectable.
[2]Calculated for a PHS polymer chain $(C_8H_8O)_n$
[3]Calculated for a one percent solution of PHS in 0.1 N LiOH. $(C_8H_8O)$. 1.2 LiOH
[4]Calculated for a one percent solution of PHS in 0.1 N LiOH. $(C_8H_8O)$. 1.2 LiOH-0.6 $H_2O$

EXAMPLE 4

PREPARATION OF A POLY(VINYL ALCOHOL) PRIMER SOLUTION

An exemplary poly(vinyl alcohol) (PVOH) primer solution of the invention was prepared as follows. One gram of PVOH (Aldrich, 98–99% hydrolyzed, molecular weight $M_w$=85,000–146,000) was added to 99.0 g distilled water in a round bottom flask. The mixture was heated to 80° C. and stirred until dissolution of polymer appeared complete. A water clear solution was obtained by filtering the hot solution through fluted filter paper. This primer solution, containing no surfactant, was found to be satisfactory for spin-coating experiments, but not roll-coating.

EXAMPLE 5

CHARACTERIZATION OF A PVOH PRIMER SOLUTION CONTAINING A BRANCHED ALKYL ETHOXYLATE SURFACTANT

This example demonstrates the use of a branched alkyl ethoxylate surfactant in a poly(vinyl alcohol) primer solution. The PVOH primer was prepared as in Example 4 using high purity water (Fisher Scientific, Optima® grade) in a volumetric flask.

The surface tension, $\gamma_{1v}$, of liquids was measured with an automated Wilhelmy plate surface tensiometer (ATI Cahn DCA 315) with an auto-titrator for surfactant addition. The surface tension was first measured without surfactant, followed by step-wise additions of the Genapol® UD050 branched alkyl ethoxylate surfactant, (Hoechst Celanese Corp.), followed by surface tension measurements. Table II presents the surface tension data.

It can be seen from this data that while PVOH has significant intrinsic surface activity, lowering the surface tension of water by ~8 dynes/cm, the branched alkyl ethoxylate surfactant exhibits nearly identical performance in the primer solution as in pure water. Both the critical micelle concentration (cmc=0.11 g/l) and the plateau value of surface tension (about 27 dynes/cm) are nearly identical for solutions with and without PVOH, any slight differences being attributable to the incremental surface activity of PVOH. There is neither a detrimental nor a synergistic interaction between PVOH and Genapol® UD050 surfactant.

TABLE II.

Surface tension, $\gamma_{lv}$, of water and PVOH primer solutions as a function of Genapol® UD050 surfactant concentration.

| Concentration Genapol® UD050 surfactant (g/l) | $\gamma_{lv}$ (dynes/cm) in $H_2O$ | $\gamma_{lv}$ (dynes/cm) in 1% PVOH |
|---|---|---|
| 0.0000 | 72.16 | 64.41 |
| 0.0100 | 46.04 | 48.50 |
| 0.0299 | 37.24 | 38.92 |
| 0.0596 | 31.71 | 32.35 |
| 0.0990 | 28.42 | 28.13 |
| 0.1478 | 27.48 | 27.13 |
| 0.2057 | 27.28 | 26.90 |
| 0.2723 | 27.17 | 26;85 |
| 0.3475 | 27.27 | 26.82 |
| 0.4306 | 27.25 | 26.82 |
| 0.5213 | 27.26 | 26.76 |

EXAMPLE 6

CHARACTERIZATION OF A PVOH PRIMER SOLUTION CONTAINING A LINEAR ALKYL ETHOXYLATE SURFACTANT

This experiment demonstrates the use of a linear alkyl ethoxylate surfactant in PVOH primer solutions. Three primer solutions (1.0% w/w, 2.0% w/w, and 3.0% w/w) were prepared for the experiment as described in Example 4.

The surface tension, $\gamma_{1v}$, of liquids was measured as described in Example 5 with step-wise additions of the Genapol® 26-L-60N linear alkyl ethoxylate surfactant, (Hoechst Celanese Corp.). Table III presents the surface tension data. It can be seen from Table III that above the critical micelle concentration (cmc=0.01 g/l), which is independent of PVOH concentration over this range, the plateau surface tension ($\gamma_{1v}$~31 dynes/cm) is likewise independent of PVOH concentration. There is no evidence of a detrimental or a synergistic interaction between PVOH and Genapol® 26-L-60N surfactant.

TABLE III.

Surface tension, $\gamma_{lv}$, of water and PVOH primer solutions as a function of Genapol® 26-L-60N surfactant concentration.

| Concentration Genapol® 26-L-60N surfactant (g/l) | $\gamma_{lv}$ (dynes/cm) in $H_2O$ | $\gamma_{lv}$ (dynes/cm) in 1% PVOH | $\gamma_{lv}$ (dynes/cm) in 2% PVOH | $\gamma_{lv}$ (dynes/cm) in 3% PVOH |
|---|---|---|---|---|
| 0.00000 | 71.43 | 66.95 | 61.85 | 64.48 |
| 0.00040 | 56.24 | 53.02 | 51.73 | 53.05 |
| 0.00120 | 48.74 | 45.82 | 43.31 | 44.61 |
| 0.00239 | 43.62 | 40.70 | 38.60 | 39.87 |
| 0.00398 | 39.85 | 37.00 | 35.25 | 35.39 |
| 0.00596 | 36.60 | 34.15 | 32.84 | 33.41 |
| 0.00833 | 33.92 | 32.54 | 31.53 | 31.81 |
| 0.01108 | 32.41 | 31.58 | 30.99 | 31.14 |
| 0.01420 | 30.86 | 31.31 | 30.41 | 30.75 |
| 0.01768 | 30.47 | 31.05 | 30.45 | 30.67 |
| 0.02153 | 30.35 | 30.98 | 30.51 | 30.74 |
| 0.02572 | 30.37 | 31.06 | 30.49 | 30.79 |
| 0.03026 | 30.42 | 30.89 | 30.66 | 30.93 |

EXAMPLE 7

WETTABILITY OF PRIMED SUBSTRATES ASSESSED USING STATIC CONTACT ANGLE MEASUREMENT WITH WATER

Four inch circles were cut from biaxially-oriented polypropylene (BOPP) film (Trespaphan® FND grade) with a scalpel. Any dust on the film was blown off with a jet of clean, filtered air. The films were either coated immediately with one of the primer solutions described in Examples 1 to 6 or they were corona-discharge treated and then coated with one of the primer solutions described in Examples 1 to 6. Supplemental corona treatment was performed using a Tantec Lab System II corona treater using a ceramic electrode with a 2 mm gap. The power setting was 90%, and the electrode was scanned over the film surface by hand for 20 s (approximately 10 passes).

Approximately 10 g of primer solution was dispensed on the polypropylene film. A spread cycle of 300 rpm for 1 s was followed immediately by a spin cycle of 2000 rpm for 10 s. The coated films were dried in an oven maintained at 50° C. for ~30 s. Several coated film samples were prepared with each coating solution.

Static water contact angles were measuring using a Tantec Cam-Film-T® contact angle meter. The measured static contact angle results for polypropylene films are shown in Table IV and are compared to static water contact angles for uncoated polypropylene film.

TABLE IV.

Static Contact Angle of Water on FND BOPP Films With and Without Supplementary Corona Treatment and Primer Layers.

| Sample | Corona Treated | Not Corona Treated |
|---|---|---|
| Unprimed | 78° | 94° |
| PVOH primed | 48° | 42° |
| PHS-OH primed | not measured | 67° |
| PHS-Li primed | 15° | 12° |

This data shows that the presence of lithium hydroxide in the PHS primer coating greatly reduces the measured static contact angle of water, and, by inference, of aqueous metal polysilicate barrier coating solutions especially those containing no surfactant.

EXAMPLE 8

WETTABILITY OF POLY(VINYL ALCOHOL)/POLY(VINYL BUTYRAL) PRIMER LAYERS

A series of primer solutions were prepared using butyral-modified PVOH polymers depicted by the formula:

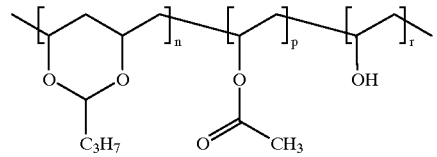

wherein n, p, and r denote the mole fractions of the polymer repeat units and the sum of n,p and r is 1. These polymers, further described in Table V, were dissolved in water, isopropanol, or water/isopropanol mixtures. No surfactant was added to these primer solutions. The wettability of primer layers prepared from these solutions was measured by dynamic contact angle analysis. Primed samples were prepared by dip-coating flame-cleaned microscope cover slips in the primer solutions. Advancing and receding contact angles of water on these primer layers were measured using a Cahn-ATI DCA 315 dynamic contact angle analyzer. The results are presented in Table V. Unsatisfactory wetting was observed for n≧0.70.

TABLE V.

Approximate Compositions and Dynamic Contact Angles (Advancing and Receding) for a Series of Butyral-modified PVOH Variants

| Mole Fraction Butyral, n | Mole Fraction Acetate, p | Mole Fraction Hydroxyl, r | Advancing Contact Angle | Receding Contact Angle |
|---|---|---|---|---|
| 0.0 | 0.02 | 0.98 | 36° | 16° |
| 0.05 | 0.02 | 0.93 | 54.6° | 23.3° |
| 0.10 | 0.02 | 0.88 | 53° | 22.5° |
| 0.70 | 0.02 | 0.28 | 83.2° | 36.9° |
| 0.76 | 0.02 | 0.22 | 81.6° | 38.8° |
| 0.83 | 0.02 | 0.15 | 82.3° | 44.2° |

EXAMPLE 9

OXYGEN TRANSMISSION RATE OF PHS-PRIMED ARTICLES PREPARED BY SPIN-COATING

This example is typical for the preparation of a lithium-potassium copolysilicate, $(Li_2O)_x(K_2O)_{1-x}(SiO_2)_y$, in which the total solids level is 10% by weight and the mole fraction of $Li_2O$, x, and the mole ratio, y, of $SiO_2$ to the combined alkali metal oxides are 0.5 and 3.64, respectively. The lithium polysilicate used was Inobond® Li 2043 lithium polysilicate solution (van Baerle) having 3.0% w/w $Li_2O$ and 24.5% w/w $SiO_2$. The potassium polysilicate used was K-4009 potassium silicate solution (van Baerle) having 13.0% w/w $K_2O$ and 26.85% w/w $SiO_2$. With continuous stirring, Inobond® Li 2043 solution, 53.1 g was diluted with distilled water, 108.1 g, followed by addition of K-4009 polysilicate, 38.8 g. The dispersion was stirred overnight and filtered through Celite® 545 diatomaceous earth.

Four inch circles were cut from Trespaphan® FND 30 BOPP film with a scalpel. Any dust on the film was blown off with a jet of clean, filtered air. Approximately 10 g of one of the primer solutions described in Examples 1 and 2 was dispensed on the BOPP film. A spread cycle of 300 rpm for 1 s was followed immediately by a spin cycle of 2000 rpm for 10 s. The coated films were dried in an oven maintained at 50° C. for about 30 s.

After the priming process, approximately 10 g of the $(Li_2O)_x(K_2O)_{1-x}(SiO_2)_y$ copolysilicate coating solution (x=0.5, y=3.64) was dispensed on the primed side of the polypropylene film. A spread cycle of 300 rpm for 1 s was followed immediately by a spin cycle of 2000 rpm for 10 s. The coated films were again dried in an oven maintained at 50° C. for ~30 s.

Oxygen transmission rate (OTR) measurements were made using a Mocon® 2/20 instrument. Measurements were made for each sample at 30° C. and 0%, 40% and 90% relative humidity. The results are shown in Table VI.

TABLE VI.

Oxygen Transmission Rate of Lithium/
Potassium Copolysilicates Coated on PHS-Primed
BOPP film (1.2 mil thick).

| | Oxygen Transmission Rate $cm^3/[m^2$ day atm] at 30° C. | | |
|---|---|---|---|
| Primer | 0% RH | 40% RH | 90% RH |
| PHS-OH | 500 | 387 | 174 |
| PHS-Li | 604 | 692 | 195 |

EXAMPLE 10

OXYGEN TRANSMISSION RATE OF PVOH-PRIMED ARTICLES PREPARED BY SPIN-COATING

Four inch circles were cut from Trespaphan® FND 15 BOPP film with a scalpel. Any dust on the film was blown off with a jet of clean, filtered air. Corona treatment was performed using a Tantec Lab System II corona treater using a ceramic electrode with a 2 mm gap. The power setting was 90%, and the electrode was scanned over the film surface by hand for 20 s (approximately 10 passes). Approximately 10 g of the PVOH primer solution described in Example 4 was dispensed on the polypropylene film. A spread cycle of 300 rpm for 1 s was followed immediately by a spin cycle of 2000 rpm for 10 s. The coated films were dried in an oven maintained at 50° C. for about 30 s.

After the priming process, approximately 10 g of the copolysilicate coating solution described in Example 9 was dispensed on the primed side of the polypropylene film. A spread cycle of 300 rpm for 1 s was followed immediately by a spin cycle of 2000 rpm for 10 s. The coated films were again dried in an oven maintained at 50° C. for ~30 s.

OTR measurements were made using a Mocon Ox-Tran® 2/20 instrument at several relative humidities. The results are shown in Table VII.

TABLE VII.

Oxygen Transmission Rates for
Lithium-potassium Copolysilicate Coated onto
PVOH-primed BOPP film (0.5 mil thick)

| Relative Humidity | Oxygen Transmission Rate $cm^3/[m^2$ day atm] at 23° C. |
|---|---|
| 0% | 120 |
| 40% | 65 |
| 60% | 61 |
| 70% | 82 |
| 80% | 95 |
| 90% | 121 |

EXAMPLE 11

COMPARATIVE EXAMPLE OF BARRIER COATING PERFORMANCE ON UNPRIMED BOPP FILM

This example employs a lithium-potassium copolysilicate, $(Li_2O)_x(K_2O)_{1-x}(SiO_2)_y$, (10% total solids, x=0.5, y=3.64) further containing an acetylenic diol surfactant. A surfactant is necessary to obtain satisfactory wetting of barrier coating solutions on unprimed BOPP film. A 1% by weight dispersion of the Dynol® 604 acetylenic diol surfactant, (Air Products) was prepared by dispersing 1.00 g Dynol® 604 surfactant in sufficient distilled water to make 100.0 ml of total dispersion. The dispersion was stirred vigorously immediately before use.

With continuous stirring, Inobond® Li 2043 solution, 53.1 g, was diluted with distilled water, 108.1 g, followed by addition of K-4009 solution, 38.8 g. To this was added 2.0 g of well-stirred surfactant dispersion described above, yielding a copolysilicate barrier coating solution with a surfactant concentration of 0.01% by weight.

Four inch circles were cut from Trespaphan® FND 15 BOPP film with a scalpel. Any dust on the film was blown off with a jet of clean, filtered air. Corona treatment was performed using a Tantec Lab System II corona treater using a ceramic electrode with a 2 mm gap. The power setting was 90%, and the electrode was scanned over the film surface by hand for 20 s (approximately 10 passes). Approximately 10 g of the copolysilicate barrier coating solution was dispensed on the corona-treated surface of the BOPP film. A spread cycle of 300 rpm for 1 s was followed immediately by a spin cycle of 2000 rpm for 10 s. The coated films were again dried in an oven maintained at 50° C. for about 30 s.

OTR measurements were made using a Mocon Ox-Tran® 2/20 instrument. An OTR of 429 $cm^3/[m^2$ day atm] was measured at 30° C. and 0% RH for a sample prepared in this manner.

EXAMPLE 12

COMPARATIVE EXAMPLE OF BARRIER COATING PERFORMANCE ON UNPRIMED BOPP FILM

A barrier coating solution was prepared as described in Example 11. The film spin-coated as described in Example 11, except corona treatment was not performed on these films. OTR measurements were made using a Mocon Ox-Tran® 2/20 instrument. An OTR of 3221 $cm^3/[m^2$ day atm] was measured at 30° C. and 0% RH for a sample prepared in this manner. This is essentially identical to the OTR of uncoated Trespaphan® FND 15 BOPP film.

EXAMPLE 13

PREPARATION OF COATED ARTICLES WITH BARRIER LAYERS CONTAINING DELAMINATED VERMICULITE

Colloidal solutions of lithium polysilicate and Micro-Lite® 963 Plus+ grade dispersed vermiculite were prepared using the reagents and quantities listed in Table VIII by first diluting the MicroLite® dispersion with water and then adding the lithium polysilicate solution to it with stirring. Solutions were stirred for 30 minutes immediately before coating and were not filtered.

Four inch circles were cut from Trespaphan® FND 15 BOPP film with a scalpel. Any dust on the film was blown off with a jet of clean, filtered air. They were then corona treated to improve wetting by primer solutions and adhesion of dried primer layers. Corona treatment was performed using a Tantec Lab System II corona treater using a ceramic electrode with a 2 mm gap. The power setting was 90%, and the electrode was scanned over the film surface by hand for 20 s (approximately 10 passes).

Approximately 10 g of PHS-Li primer solution described in Example 1 was dispensed on the polypropylene film. A spread cycle of 300 rpm for 1 s was followed immediately by a spin cycle of 2000 rpm for 10 s. The coated films were dried in an oven maintained at 50° C. for ~30 s.

After the priming process, approximately 10 g of one of the copolysilicate/vermiculite dispersions described in Table VIII was dispensed onto the primed side of the polypropylene film. A spread cycle of 300 rpm for 1 s was followed immediately by a spin cycle of 2000 rpm for 10 s. The coated films were again dried in an oven maintained at 50° C. for ~120 s.

OTR measurements were made using a Mocon Ox-Tran® 2/20 instrument at 30° C. under dry conditions. OTR data are presented in Table VIII.

TABLE VIII.

Lithium-potassium Silicate and Dispersed Vermiculite as Oxygen Barrier Coatings on BOPP Film

| Percent (w/w) lithium polysilicate in dried coating | MicroLite ® 963 Plus+ Dispersion (g) | Inobond ® Li-2043 (g) | Distilled Water (g) | OTR cm³/[m² day atm] 30° C. & 0% RH |
|---|---|---|---|---|
| 100% | 0 | 13.64 | 36.36 | 1161 |
| 90% | 5.07 | 12.25 | 32.68 | 1563 |
| 80% | 10.00 | 10.91 | 29.09 | 1662 |
| 60% | 20.00 | 8.18 | 21.82 | 1204 |
| 40% | 30.00 | 5.45 | 14.55 | 181 |
| 20% | 40.00 | 2.73 | 7.27 | 3 |
| 10% | 44.93 | 1.38 | 3.69 | 2 |
| 0% | 50.00 | 0 | 0 | 36 |

EXAMPLE 14

PREPARATION OF COATED ARTICLES WITH BARRIER LAYERS CONTAINING DELAMINATED VERMICULITE

An aqueous colloidal suspension containing lithium polysilicate and MicroLite® 963 Plus+ grade dispersed vermiculite in which 40% by weight of the coating solids were lithium polysilicate was prepared following the formulation provided in Example 13. BOPP film samples were prepared for coating, primed with a 1% by weight solution of PHS-Li and coated with polysilicate/vermiculite coating following the procedure described in Example 13.

Oxygen transmission rate was measured at several relative humidities on a single representative film. The OTR was measured first under dry conditions and subsequently at increased relative humidity. The film was not removed from sample chamber between measurements. Upon conclusion of testing at 90% relative humidity, the sample chamber was returned to dry conditions and the OTR measured again. OTR results are shown in Table IX.

TABLE IX.

Humidity dependence of Oxygen Transmission Rate of Lithium Polysilicate/Dispersed Vermiculite Barrier Coatings (40% lithium polysilicate) on BOPP Film

| Relative Humidity | OTR cm³/[m² day atm] (30° C. & 0% RH) |
|---|---|
| 0% (initial) | 19 |
| 40% | 13 |
| 60% | 12 |
| 70% | 13 |
| 80% | 15 |
| 90% | 21 |
| 0% (final) | 26 |

EXAMPLE 15

PREPARATION OF COATED ARTICLES WITH BARRIER LAYERS CONTAINING DELAMINATED VERMICULITE

An aqueous colloidal suspension containing lithium polysilicate and MicroLite® 963 Plus+ grade dispersed vermiculite in which 10% by weight of the coating solids were lithium polysilicate was prepared according to the formulation provided in Example 13. BOPP film samples were prepared for coating, primed with a 1% by weight solution of PHS-Li and coated with a polysilicate/vermiculite coating following the procedure described in Example 13.

OTR were measured at different values of relative humidity on a single representation film. The OTR was measured first under dry conditions and subsequently at increased relative humidity. The film was not removed from the sample chamber between measurements. Upon conclusion of testing at 90% RH, the sample chamber was returned to dry conditions and the OTR measured again. OTR are shown in Table X.

TABLE X.

Humidity dependence of Oxygen Transmission Rate of Lithium Polysilicate/Dispersed Vermiculite Barrier coatings (10% lithium polysilicate) on BOPP Film

| Relative Humidity | OTR cm³/[m² day atm] (30° C. & 0% RH) |
|---|---|
| 0% (initial) | 1 |
| 40% | 1 |
| 60% | 1 |
| 70% | 1 |

TABLE X.-continued

Humidity dependence of Oxygen Transmission Rate of Lithium Polysilicate/Dispersed Vermiculite Barrier coatings (10% lithium polysilicate) on BOPP Film

| Relative Humidity | OTR cm$^3$/[m$^2$ day atm] (30° C. & 0% RH) |
|---|---|
| 80% | 2 |
| 90% | 4 |
| 0% (final) | 1 |

EXAMPLE 16

APPLICATION OF PRIMER AND BARRIER COATING SOLUTIONS BY REVERSE GRAVURE COATING PROCESS

Solutions of lithium polysilicate/dispersed vermiculite were prepared using the amounts shown in Table XI and the procedure described in Example 13. BOPP film was run through a multiple stage reverse gravure roll coater with in-line corona treatment such that a primer layer of either PHS-Li (containing 0.1% Dynol® 604 surfactant) or PVOH was applied and dried, followed by application of a lithium polysilicate/dispersed vermiculite coating solution and drying using a reverse gravure roll coating process.

OTR measurements were made using a Mocon Ox-Tran® 2/20 instrument at 30° C. under dry conditions. OTR data are presented in Table XI.

TABLE XI

Descriptions of Barrier Coating Solutions and Oxygen Transmission Rate of Lithium Polysilicate/Dispersed Vermiculite Barrier Coatings Applied by Reverse Gravure Coating to BOPP Film

| Primer | Percent (w/w) lithium polysilicate in dried coating | Total solids | MicroLite ® 963++ Dispersion (g) | Inobond ® Li-2043 (g) | Distilled Water (g) | OTR cm$^3$/(m$^2$day atm) at 30° C. & 0% RH |
|---|---|---|---|---|---|---|
| PHS—Li | 20 | 7.5% | 2400 | 164 | 436 | 263 |
| PVOH | 20 | 2.5% | 800 | 54.5 | 2145 | 395 |
| PVOH | 40 | 2.5% | 600 | 109 | 2291 | 210 |
| PVOH | 40 | 5.0% | 1200 | 218 | 1582 | 168 |
| PVOH | 40 | 7.5% | 1800 | 327 | 872 | 122 |

EXAMPLE 17

APPLICATION OF PVOH PRIMER AND BARRIER COATING SOLUTIONS BY REVERSE GRAVURE COATING PROCESS

A 1% solids PVOH primer was prepared by dissolving, in 19 kg of water, 190 g of PVOH ($M_w$=31,000–50,000, 98–99% hydrolyzed) while heating to 75° C. The PVOH solution was cooled and transferred to a high-density polyethylene (HDPE) carboy, followed by addition, with continuous mixing, of 19 g of Dynol® 604 surfactant and 19 g of Genapol® UD050 surfactant. This primer solution, containing 1% PVOH, 0.1% Dynol® 604 surfactant, and 0.1% Genapol® UD050 surfactant had a surface tension of 26.8 dynes/cm.

A series of lithium-potassium copolysilicate, $(Li_2O)_x(K_2O)_{1-x}(SiO_2)_y$ with x=0.5 and y=3.64, barrier coating solutions were prepared with 3%, 6%, 9%, 12%, and 15% solids by the method described in Example 9.

The primer was applied by reverse gravure coating to Trespaphan® FND 20 BOPP film (0.8 mil thick) on the factory-corona-treated side, but without supplemental corona treatment. The primer solution wet the BOPP film very well. The ceramic-coated gravure cylinder had a laser-engraved pattern rotated 60° with respect to the cylinder axis, 220 lines per inch, and a cell volume of 10 billion cubic microns per square inch. The primer solution was applied at a line speed of 500 ft/min and was dried at ~55° C. in a 50 ft air flotation dryer.

The lithium-potassium copolysilicate barrier coatings were applied to the PVOH-primed BOPP film using the same reverse gravure coating variables, except that the line speed was 200 ft/min.

OTR measurements were made using a Mocon Ox-Tran® 2/20 instrument at 23° C. and 50% relative humidity. OTR data are presented in Table XII.

TABLE XII.

Oxygen Transmission Rate and Approximate Thickness of Lithium-potassium Copolysilicate Barrier Coatings on PVOH-primed BOPP Film (0.8 mil thick).

| % Solids | Number of OTR Measurements | OTR cm$^3$/[m$^2$ day atm] 23° C. & 50% RH | Approximate Thickness (nm) |
|---|---|---|---|
| None (control) | 2 | 1530 ± 2 | 0 |
| 3% | 3 | 611 ± 17 | 70 |
| 6% | 4 | 155 ± 5 | 150 |
| 9% | 4 | 48 ± 2 | 180 |
| 12% | 13 | 34 ± 8 | 220 |
| 15% | 4 | 48 ± 14 | 250 |

EXAMPLE 18

APPLICATION OF PVOH PRIMER SOLUTION CONTAINING BIOCIDE BY REVERSE GRAVURE COATING PROCESS

A 1% solids PVOH primer containing the Kathon® LX biocide (1.5% solution, Rohm and Haas) was prepared by dissolving, in 18.772 kg of water, 190 g of PVOH ($M_w$=31,000–50,000, 98–99% hydrolyzed) while heating to 70° C. The PVOH solution was filtered, cooled and transferred to a high-density polyethylene (HDPE) carboy, followed by addition, with continuous mixing, of 19 g of Dynol® 604 surfactant, 19 g of Genapol® 9 UD050 surfactant and 0.75 g of Kathon® LX biocide.

A 12% solids lithium-potassium copolysilicate, $(Li_2O)_x$ $(K_2O)_{1-x}(SiO_2)_y$ with x=0.5 and y=3.64, barrier coating solution was prepared by the method described in Example 9.

The primer was applied by reverse gravure coating to Trespaphan® FND 20 BOPP film (0.8 mil thick). The side of the film that had been corona-treated at the factory was primed without supplemental corona treatment. The ceramic-coated gravure cylinder had a laser-engraved pattern rotated 60° with respect to the cylinder axis, 220 lines per inch, and a cell volume of 10 billion cubic microns per square inch. The primer solution was applied at a line speed of 500 ft/min and was dried at ~55° C. in a 50 ft air flotation dryer.

The lithium-potassium copolysilicate barrier coatings were applied to the PVOH-primed BOPP film using the same reverse gravure coating variables, except that the cell volume was 15 billion cubic microns per square inch and the line speed was 200 ft/min.

OTR measurements were made using a Mocon Ox-Tran® 2/20 instrument. Four measurements on samples from a roll of film yielded an OTR of 18±2 $cm^3/[m^2$ day atm] at 23° C. and 50% relative humidity.

EXAMPLE 19

COMPARATIVE EXAMPLE OF APPLICATION OF PVOH PRIMER SOLUTION BY REVERSE GRAVURE COATING PROCESS

A PVOH primer was prepared by dissolving 80 g of PVOH ($M_w$=85,000–146,000, 98–99% hydrolyzed) in 4000 g of deionized water while heating to 85° C. The PVOH solution was filtered, while hot, through a fluted paper filter. After cooling, 4000 g of deionized water was added with continuous stirring, followed by addition of 1.6 g of Genapol® UD050 surfactant. This primer solution, containing 1% PVOH and 0.02% Genapol® UD050 surfactant had a surface tension of 28.0±0.2 dynes/cm.

The PVOH primer was applied by reverse gravure coating to Trespaphan® FND 20 BOPP film (0.8 mil thick). The side of the film that had been corona-treated at the factory was primed without supplemental corona treatment. The ceramic-coated gravure cylinder had a laser-engraved pattern rotated 60° with respect to the cylinder axis, 220 lines per inch, and a cell volume of 10 billion cubic microns per square inch. The primer solution was applied at a line speed of 150 ft/min and was dried at ~80° C. in a 50 ft air flotation dryer.

This primer solution dewetted severely from the BOPP film before reaching the dryer, yielding a primed film that was largely uncoated but only decorated with particles of PVOH.

EXAMPLE 20

COMPARATIVE EXAMPLE OF APPLICATION OF PVOH PRIMER SOLUTION BY REVERSE GRAVURE COATING PROCESS

A PVOH primer was prepared by dissolving 80 g of PVOH ($M_w$=31,000–50,000, 99% hydrolyzed) in 4000 g of deionized water while heating to 70° C. After cooling, 4000 g of deionized water was added with continuous stirring, followed by addition of 8 g of Dynol® 604 surfactant. This primer solution, containing 1% PVOH and 0.1% Dynol 604 surfactant had a surface tension of 25.8±0.1 dynes/cm. There was a noticeable accumulation of droplets of undispersed Dynol® 604 surfactant on the surface of the primer in the carboy.

The PVOH primer was applied by reverse gravure coating to Trespaphan® FND 20 BOPP film (0.8 mil thick). The side of the film that had been corona-treated at the factory was primed without supplemental corona treatment. The ceramic-coated gravure cylinder had a laser-engraved pattern rotated 60° with respect to the cylinder axis, 220 lines per inch, and a cell volume of 10 billion cubic microns per square inch. The primer solution was applied at a line speed of 150 ft/min and was dried at ~80° C. in a 50 ft air flotation dryer.

This PVOH primer solution wetted the BOPP film well, but ultimately caused the formation of non-wetting spots on the gravure cylinder that appeared to be the result of undispersed droplets of Dynol® 604 surfactant. These interfered with subsequent application of the barrier coating solution.

Numerous modifications and variations of the present invention are included in the above-identified specification and are expected to be obvious to one of skill in the art. Such modifications and alterations to the compositions and processes of the present invention are believed to be encompassed in the scope of the claims appended hereto.

What is claimed is:

1. A method for providing a barrier coating to a polyolefin substrate comprising the steps of:
    (a) applying to said substrate a primer layer containing a random vinyl polymer comprised of repeat units, wherein at least 75% of said polymer repeat units contain side groups having hydroxyl moieties;
    (b) allowing the primer layer to dry; and
    (c) applying a waterborne coating solution which forms a dry inorganic barrier layer over the dried primer layer.

2. The method according to claim 1 further comprising subjecting said substrate to plasma treatment, corona treatment, flame treatment or chemical etching or oxidation prior to application of said primer.

3. The method according to claim 1 further comprising subjecting said substrate with its dried primer layer to plasma treatment, corona treatment, flame treatment or chemical etching and oxidation prior to application of said barrier coating solution.

4. The method according to claim 1 wherein said vinyl polymer is poly(vinyl alcohol).

5. The method according to claim 4 wherein the average molecular weight of said poly(vinyl alcohol) in the primer layer is between 50,000 and 185,000 and the degree of hydrolysis is at least 75%.

6. The method according to claim 1 wherein said random vinyl polymer is a modified poly(vinyl alcohol) of the formula:

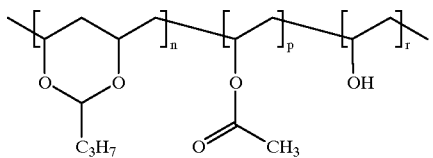

wherein n, p, and r denote the mole fractions of the polymer repeat units and the sum of n,p and r is 1.

7. The method according to claim 6 wherein the average molecular weight of said modified poly(vinyl alcohol) is between 40,000 and 100,000, and r is at least 0.75.

8. The method according to claim 1 wherein said vinyl polymer is either a linear or branched poly(para-hydroxystyrene).

9. The method according to claim 8 wherein said poly (para-hydroxystyrene) is partially converted to an alkali metal phenoxide salt, the resulting linear or branched random copolymer having the formula:

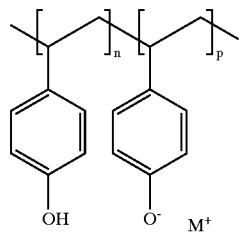

where M is one or more of the elements lithium, sodium, or potassium and the sum of the mole fractions, n and p, is 1.

10. The method according to claim 1 wherein the primer layer contains one or more surfactants.

11. The method according to claim 10 wherein at least one surfactant is an acetylenic diol and a second surfactant is an alkyl ethoxylate.

12. The method according to claim 1 wherein said coating solution comprises sodium polysilicate, potassium polysilicate, lithium polysilicate, or mixtures thereof.

13. The method according to claim 12 wherein said coating solution comprises a copolysilicate of lithium and potassium of formula $(Li_2O)_x(K_2O)_{1-x}(SiO_2)_y$ wherein (i) y is between 1 and 10, if x is less than 1; or (ii) y is greater than 4.6, if x is 1.

14. The method according to claim 1 wherein said barrier layer comprises a layered silicate dispersed in a solid matrix of alkali metal polysilicate, wherein the weight fraction of layered silicate in the alkali metal polysilicate ranges from 0.01 to 0.99.

15. The method according to claim 1 further comprising applying a protective topcoat layer over said dried barrier layer.

* * * * *